US012168963B1

(12) United States Patent
Takano et al.

(10) Patent No.: US 12,168,963 B1
(45) Date of Patent: Dec. 17, 2024

(54) ENGINE AIR INTAKE STRUCTURE

(71) Applicant: KAWASAKI MOTORS, LTD., Hyogo (JP)

(72) Inventors: Goki Takano, Hyogo (JP); Alexander Sics, Grand Rapids, MI (US); Matthew Lompe, Grand Rapids, MI (US)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/422,498

(22) Filed: Jan. 25, 2024

(51) Int. Cl.
*F02D 9/10* (2006.01)
*F02M 35/024* (2006.01)

(52) U.S. Cl.
CPC ......... *F02D 9/1035* (2013.01); *F02D 9/1065* (2013.01); *F02M 35/02483* (2013.01)

(58) Field of Classification Search
CPC ................ F02D 9/1035; F02D 9/1065; F02M 35/02483
USPC ..................................................... 123/184.21
See application file for complete search history.

(56) References Cited

U.S. PATENT DOCUMENTS

2003/0154714 A1* 8/2003 Ito ........................ F02D 41/1454 60/299

FOREIGN PATENT DOCUMENTS

WO WO-9618028 A1 * 6/1996 .............. F02D 11/10
WO WO-2008034656 A1 * 3/2008 ............ F02D 11/106

OTHER PUBLICATIONS

WO-9618028-A1 (Bentz et al.) (Jun. 13, 1996) (Machine Translation) (Year: 1996).*

* cited by examiner

*Primary Examiner* — Mahmoud Gimie
(74) *Attorney, Agent, or Firm* — GREENBLUM & BERNSTEIN, P.L.C.

(57) ABSTRACT

An engine air intake structure includes an electronically controlled throttle and an air intake pipe which delivers intake air to an air intake port of the engine. The electronically controlled throttle is attached to the air intake pipe. The electronically controlled throttle includes: a throttle valve which regulates the amount of air to be supplied to the engine; a throttle body which accommodates the throttle valve therein; and an electronic control unit which controls the throttle valve. The electronic control unit includes a control circuit board which is arranged to a side of the throttle body which faces away from an engine body of the engine.

7 Claims, 6 Drawing Sheets

ENGINE AIR INTAKE STRUCTURE

BACKGROUND OF THE INVENTION

Field of the Invention

The present disclosure relates to an engine air intake structure to supply air to an engine.

Description of Related Art

An engine is often provided with an electronically controlled throttle which includes a throttle valve that regulates the amount of air to be supplied to the engine and an electronic control unit that controls the throttle valve. The electronic control unit for such an engine is often positioned to face towards the engine interior, in order to prevent foreign objects from colliding therewith during the operation of the engine. This means that the electronic control unit is arranged adjacent to an engine body of the engine. Such arrangement makes it difficult for the space around the electronically controlled throttle to be used more efficiently.

SUMMARY OF THE INVENTION

An object of the present disclosure is to provide an engine air intake structure, which structure allows the space around an electronically controlled throttle to be used more efficiently.

The present disclosure provides an engine air intake structure, which engine includes an electronically controlled throttle and an air intake pipe which delivers intake air to an air intake port of the engine. The electronically controlled throttle is attached to the air intake pipe. The electronically controlled throttle includes: a throttle valve which regulates the amount of air to be supplied to the engine; a throttle body which accommodates the throttle valve therein; and an electronic control unit which controls the throttle valve. The electronic control unit includes a control circuit board which is arranged to a side of the throttle body which faces away from an engine body of the engine.

According to this configuration, the control circuit board is arranged to a side of the throttle body which faces away from the engine body. In this way, space interference of the control circuit board with nearby components can be mitigated better than when the control circuit board is arranged between the throttle body and the engine body. For example, the throttle body can be arranged in closer relation to the engine body. In addition, a spacing can be secured between the throttle body and the engine body for installing additional components. In this way, the space around an electronically controlled throttle can be used more efficiently.

Any combinations of at least two features disclosed in the claims and/or the specification and/or the drawings should also be construed as encompassed by the present invention. Especially, any combinations of two or more of the claims should also be construed as encompassed by the present invention.

BRIEF DESCRIPTION OF THE DRAWINGS

The present disclosure will be more clearly understood from the following description of preferred embodiments made with the help of the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike or corresponding parts throughout the different figures, and:

DESCRIPTION OF EMBODIMENTS

What follows is a description of preferred embodiments of the present disclosure made with reference to the drawings. The terms "upstream" and "downstream" used herein refer to the "upstream" and "downstream" in the direction of flow of intake air. The engine E in the instant embodiment is in the form of a so-called V engine in which two cylinder units 6 define cylinder axes AX1 (FIG. 3) that are open in a V shape. The term "cylinder axes" in this context refer to the central axes of the internal, cylindrical hollow bores of the cylinder units 6.

In the rest of the discussions, the terms "front" and "forward(s)" refer to the V banks-side or a direction of opening of the V shape in the installed state of the engine in a work machine (e.g., a lawn mower and any type of agricultural or farming machines), whereas the terms "rear" and "rearward(s)" refer to an opposite side thereof. Also, a vertical direction VD refers to a direction of extension of the axis AX of a crankshaft 2, whereas a widthwise direction WD refers to a direction perpendicular to both the vertical direction VD and a front-to-rear direction LD. In addition, in regard to the widthwise direction WD, the term "widthwise inside" refers to a side facing towards the axis AX of the crankshaft 2, whereas the term "widthwise outside" refers to a side facing away from the axis AX of the crankshaft 2.

Figure 1:
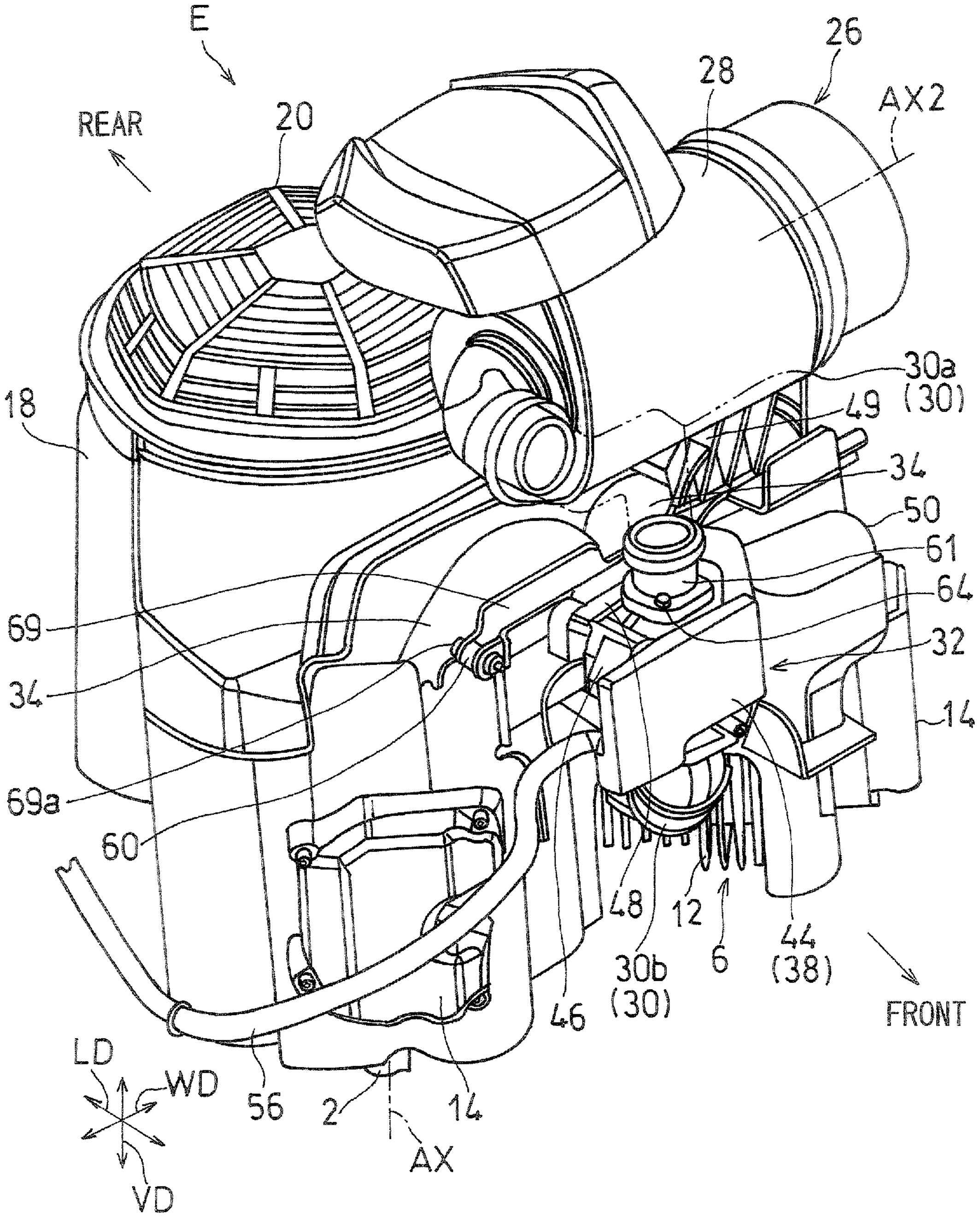
FIG. 1 shows a perspective view of an engine comprising an engine air intake structure, in accordance with a first embodiment of the present disclosure.

Turning to FIG. 1, an engine E comprising an engine air intake structure in accordance with a first embodiment of the present disclosure is in the form of a two-cylinder vertical-shaft, air-cooled engine with a rotary shaft extending in the vertical direction in the installed state of the engine. For example, the engine E is installed in a riding lawn mower. However, these are merely some of the non-limiting examples of the configuration and application of the engine E.

Figure 2:
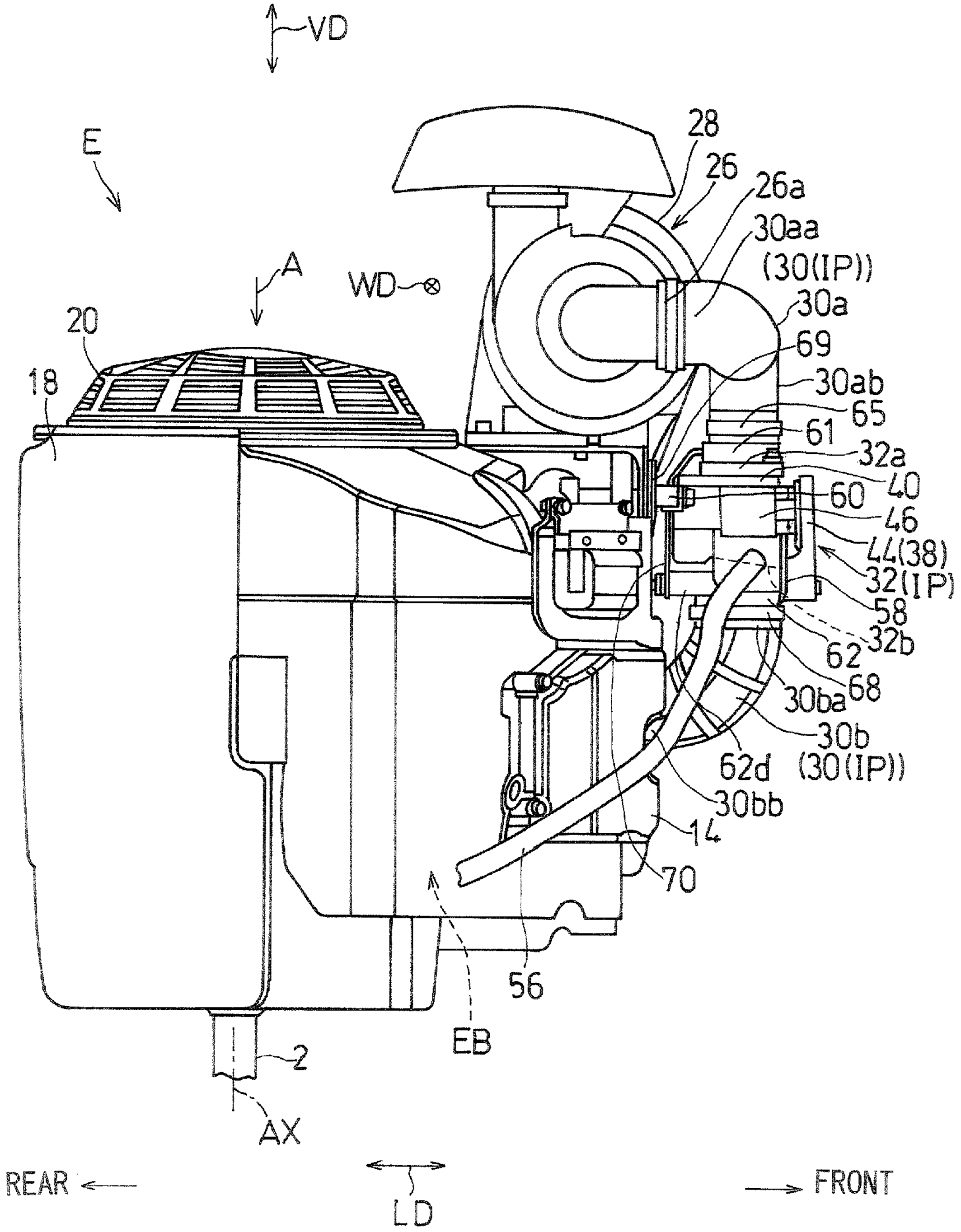
FIG. 2 shows a side view of the engine.
Figure 3:
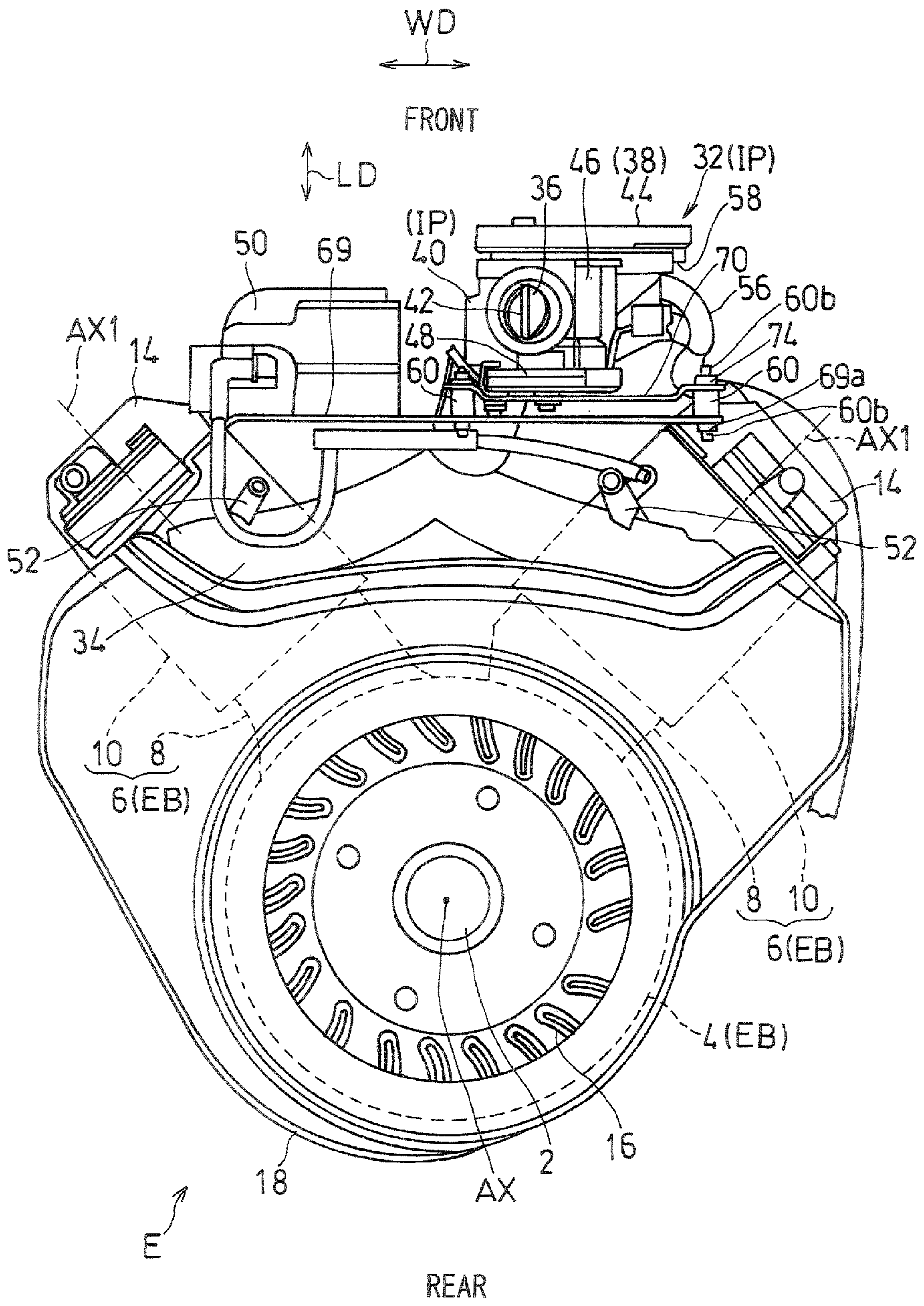
FIG. 3 shows a plan view of the engine, depicting main portions of the engine.

The engine E in the instant embodiment includes: a crankshaft 2 (which is an example of the rotary shaft of the engine) defining an axis AX extending in the vertical direction VD according to FIG. 3; a crankcase 4 (FIG. 3) which supports crankshaft 2; and a pair of cylinder units 6 protruding forwards from the front of the crankcase 4. One or more power transmission elements (not shown) are attached to an end of the crankshaft 2 for transmission of mechanical power to a work tool. In the remaining discussions, the terms "lower" and "downward(s)" refer to one end side of the crankshaft 2 in the vertical direction VD where the power transmission elements are to be attached according to FIG. 2, whereas the terms "upper" and "upward(s)" refer to the other end side of the crankshaft 2. In other words, the lower end of the crankshaft 2 couples to the power transmission elements as well as the work tool.

Turning to FIG. 3, each of the cylinder units 6 includes a cylinder 8 having a base end coupled to the crankcase 4 and a cylinder head 10 coupled to the protruding end of the cylinder 8. The cylinder axes AX1 of the cylinder units 6 extend at an angle to each other and outwards in the widthwise direction WD towards the front. The cylinder axes AX1 of the two cylinder units 6 define a V shape which is open towards the front. The crankcase 4, the cylinders 8, and the cylinder heads 10 form an engine body EB.

Turning back to FIG. 1, cooling fins 12 are formed around the outer peripheries of the cylinder units 6. The cooling fins 12 add more surface area to enhance the cooling performance of the air-cooled engine. Head covers 14 are attached to the front ends of the cylinder units 6.

Turning again to FIG. 3, an air cooling fan 16 is attached to the upper end of the crankshaft 2. The air cooling fan 16 in the instant embodiment comprises a centrifugal fan. However, this is merely one of the non-limiting examples of the air cooling fan 16. The cooling air generated by the air cooling fan 16 facilitates the cooling of the cylinder units 6. The air cooling fan 16 is coupled to the upper end of the rotary shaft 2 of the engine. A fan housing 18 is attached to the crankcase 4. The fan housing 18 covers the air cooling fan 16 from above and from the periphery, except for the front of the air cooling fan 16.

A fan cover 20 is fitted on a top side of the fan housing 18. The fan cover 20 is secured to the fan housing 18 so as to cover the top of the air cooling fan 16 according to FIG. 2. The fan cover 20 has a plurality of slits that pass air A and let it flow into the fan housing 18 while preventing foreign matters larger than the slits from entering the fan cover 20.

As the engine E starts and the crankshaft 2 rotates, the air cooling fan 16 is rotated as well in unison with the crankshaft 2. Rotation of the air cooling fan 16 causes the air A to be drawn from above the engine E through the fan cover into the fan housing 18. The fan housing 18 guides the air A, which has entered the fan housing 18, into a downward stream of flow that cools components including the cylinder units 6.

Turning again to FIG. 1, an air cleaner 26 is arranged spaced apart from the cylinder units 6 in the direction of extension of the axis AX of the crankshaft 2 or, in the instant embodiment, arranged above the cylinder units 6. The air cleaner 26 includes a cylindrical cleaner casing 28 and a cleaner element (not shown) inside the cleaner casing 28 to purify (or filter) air taken in from the environment. In the instant embodiment, the axis AX2 of the cleaner casing 28 extends in the widthwise direction WD.

The air A which has been purified by the air cleaner 26 flows through an air intake pipe 30 and an electronically controlled throttle 32 and is distributed among the cylinders by an air intake manifold 34 which separates into left and right branches as shown in FIG. 3. The air intake pipe 30 comprises an upstream air intake pipe 30*a* and a downstream air intake pipe 30*b* as shown in FIG. 2. In the instant embodiment, the upstream air intake pipe 30*a* and the downstream air intake pipe 30*b* are formed of elastic material such as rubber.

The outlet of the air cleaner 26 connects to the upstream end 30*aa* of the upstream air intake pipe 30*a*, and the downstream end 30*ab* of the upstream air intake pipe 30*a* connects to the inlet 32*a* of the electronically controlled throttle 32. Further, the outlet 32*b* of the electronically controlled throttle 32 connects to the upstream end 30*ba* of the downstream air intake pipe 30*b*, and the downstream end 30*bb* of the downstream air intake pipe 30*b* connects to the air intake manifold 34 (FIG. 3). Accordingly, the air intake pipe 30 and the electronically controlled throttle 32 define an air intake passage IP extending between the air cleaner 26 and the air intake manifold 34. How the electronically controlled throttle 32 and the air intake pipe 30 are coupled to each other will be further discussed later.

Turning back to FIG. 3, the electronically controlled throttle 32 includes a throttle valve 36 which regulates the amount of air to be supplied to the engine E and an electronic control unit 38 which controls the throttle valve 36. Hence, in addition to the throttle valve 36 and the electronic control unit 38, the electronically controlled throttle 32 includes a throttle body 40 in which the air intake passage IP is defined and inside which the throttle valve 36 is positioned, and a valve stem 42 for the throttle valve 36. In the instant embodiment, the throttle valve 36, the electronic control unit 38 and the throttle body 40 are integrally constructed. The phrase "integrally constructed" in this context means that they are constructed in an inseparable manner and may even encompass an inseparable assembly of distinct components.

Figure 4:
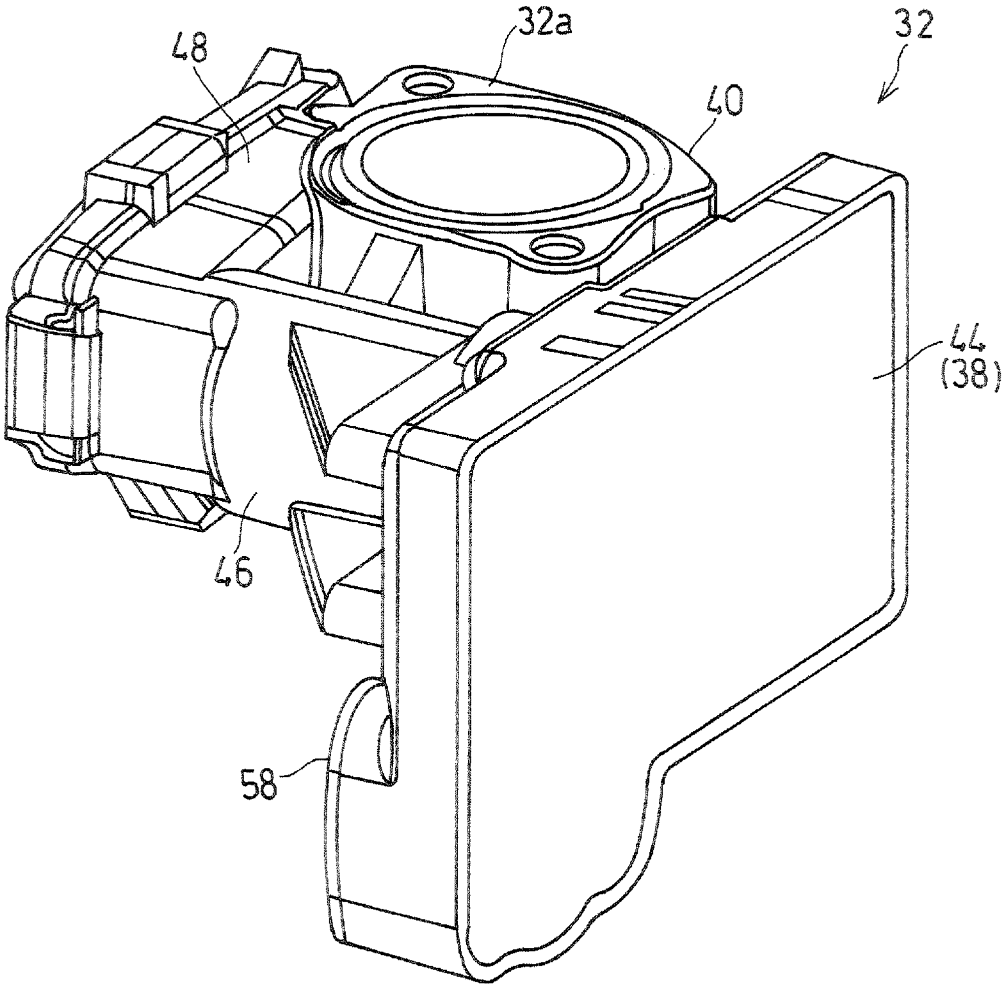
FIG. 4 shows a perspective view of an electronically controlled throttle of the engine.

The throttle valve 36 comprises, for example, a butterfly valve and regulates the amount of air A that flows through the air intake passage IP in accordance with a command from the electronic control unit 38. Turning to FIG. 4, the electronic control unit 38 includes: a control circuit board 44 on which an electronic circuit is arranged; a motor 46 which actuates the throttle valve 36; and a gearbox 48 accommodating a gearing which changes the speed of rotation from the motor 46. Thus, rotation from the motor 46 is transmitted to the valve stem 42 with a speed changed by means of the gearing in the gearbox 48 to drive the throttle valve 36 shown in FIG. 3 into rotation. It should be understood that a butterfly valve is merely one of the non-limiting examples of the throttle valve 36.

A fuel pump 50 is disposed on one of the opposite sides of the engine E in the widthwise direction WD on the front of the engine. The fuel pump 50 supplies fuel to fuel nozzles 52 located in the air intake manifold 34. In other words, the fuel pump 50 is a piece of equipment in a fuel system of the engine E. In the instant embodiment, the fuel pump 50 and the electronically controlled throttle 32 are arranged aligned in the widthwise direction WD. Further, the fuel pump 50 and the electronically controlled throttle 32 are arranged substantially at the same position both in the vertical direction VD and in the longitudinal direction LD.

The fuel pump 50 is bolted to the engine body EB through a parts mounting plate 69. The parts mounting plate 69 is configured with a bent metal sheet and bolted to the cylinder heads 10. The parts mounting plate 69 extends in the widthwise direction WD and, for example, has a relay box, an ignition coil, and other components of the fuel pump 50 attached thereon.

Discussions on how the air cleaner 26, the air intake pipe 30, and the electronically controlled throttle 32 may be arranged and supported will follow.

Turning to FIG. 1, the air cleaner 26 is detachably mounted to the air intake manifold 34. In turn, the air intake manifold 34 is detachably mounted to the cylinder heads 10 (FIG. 3). Accordingly, the air cleaner 26 is supported by the cylinder heads 10 (or the engine body EB) via the air intake manifold 34.

More specifically, a bracket 49 is attached to the lower side of the air cleaner 26, and the air cleaner 26 is bolted, through the bracket 49, to threaded holes of bosses formed on the upper side of the air intake manifold 34. However, this is only one of the non-limiting examples of how the air cleaner 26 may be mounted to the air intake manifold 34.

Turning to FIG. 2, the upstream air intake pipe 30*a* extends forwards from the air cleaner 26 and in the widthwise direction WD of the engine E and is, then, curved downwards and extends onwards to connect to the inlet 32*a* of the electronically controlled throttle 32. The downstream air intake pipe 30*b* extends downwards from the outlet 32*b* of the electronically controlled throttle 32 and is, then, curved and extends rearwards to connect to the air intake manifold 34. Accordingly, the electronically controlled throttle 32 is fitted with the air intake pipe 30 at a part of the air intake pipe 30 where it extends in the vertical.

The electronically controlled throttle 32 is arranged below the air cleaner 26 and above the cylinders 8 of the engine E. Further, as illustrated in FIG. 3, the electronically controlled throttle 32 is arranged between the two cylinders or cylinder units 6 when viewed in the direction of extension of the axis AX of the crankshaft 2. In the instant embodiment, the electronically controlled throttle 32 is arranged between the two cylinder units 6, 6 in the widthwise direction WD when viewed in a plan view.

The control circuit board 44 is arranged to a side of the throttle body which faces away from the engine body EB. Also, the gearbox 48 is interposed between the engine body EB and the throttle body 40. In the instant embodiment, the gearbox 48, the throttle body 40, and the control circuit board 44 are arranged in this order, from the engine body EB up to the front.

The motor 46 is arranged adjacently to the throttle body 40 in the widthwise direction WD. In the instant embodiment, the motor 46 is arranged to a side of the throttle body 40 which faces away from the fuel pump 50 in the widthwise direction WD. Hence, when viewed in the direction of extension of the axis AX of the crankshaft 2, the control circuit board 44, the motor 46, and the gearbox 48 which form the electronic control unit 38 are arranged in a U shape configuration that is open in the widthwise direction WD. In other words, the control circuit board 44 and the gearbox 48 protrude in the widthwise direction WD on the same side relative to the motor 46. In the instant embodiment, the electronic control unit 38 defines a cavity which is open in the widthwise direction WD towards the fuel pump 50 and in which the throttle body 40 is positioned. Moreover, a part of the control circuit board 44 protrudes in the widthwise direction WD relative to the motor 46 away from the throttle body 40.

The control circuit board 44 has a planar shape that is substantially rectangular, and has a principal surface positioned to extend along the air intake passage IP defined inside the throttle body 40. In the instant embodiment, the principal surface of the control circuit board 44 faces in the longitudinal direction LD. Accordingly, the throttle body 40 is arranged to the rear of the control circuit board 44, whereas the front of the control circuit board 44 faces outwards of the engine.

The control circuit board 44 extends away from the fuel pump 50 which is a piece of equipment in the fuel system of the engine E. More specifically, the control circuit board 44 has a planar, rectangular shape and is arranged so as to define a longitudinal direction thereof oriented in the widthwise direction WD. In other words, the control circuit board 44 extends in a direction perpendicular to the axis AX1 of the throttle body 40. At the same time, the principal surface of the control circuit board 44 extends parallel to the axis AX2 of the cleaner casing 28 (FIG. 1). In regard to the widthwise direction WD, the control circuit board 44 hardly protrudes or does not protrude relative to the throttle body 40 towards the fuel pump 50, but does protrude relative to the throttle body 40 away from the fuel pump 50.

Figure 5:
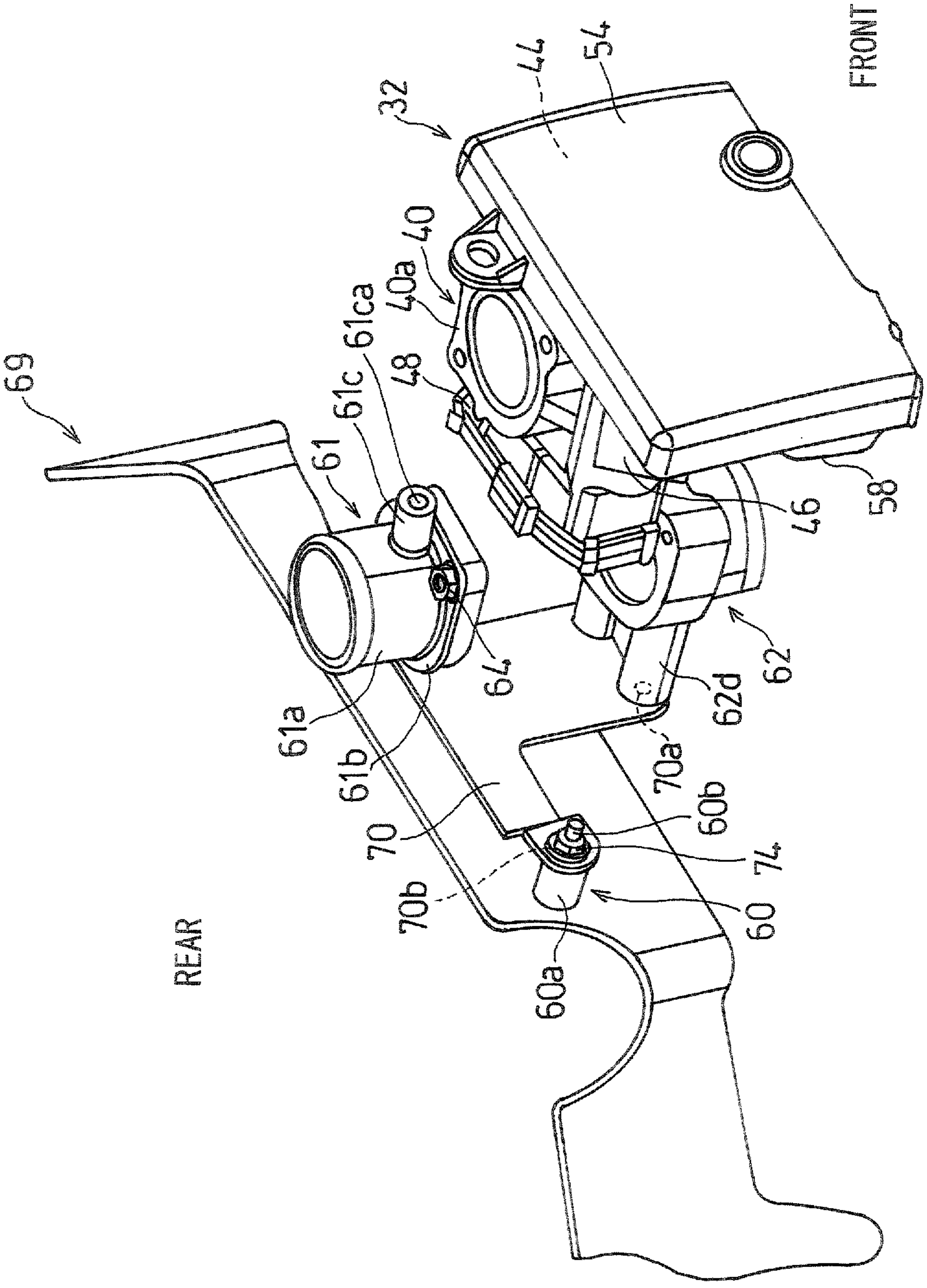
FIG. 5 shows an exploded perspective view of a mounting structure for the electronically controlled throttle.

The control circuit board 44 is covered externally by a cover member 54 shown in FIG. 5. In particular, the cover member 54 covers the front side of the control circuit board 44. In the instant embodiment, the cover member 54 comprises a small cover made of resin with an external shape generally equivalent to that of the control circuit board 44 and a size slightly larger than that of the control circuit board 44. It should be noted that the cover member 54 is omitted in FIGS. 1 to 4.

Figure 6:
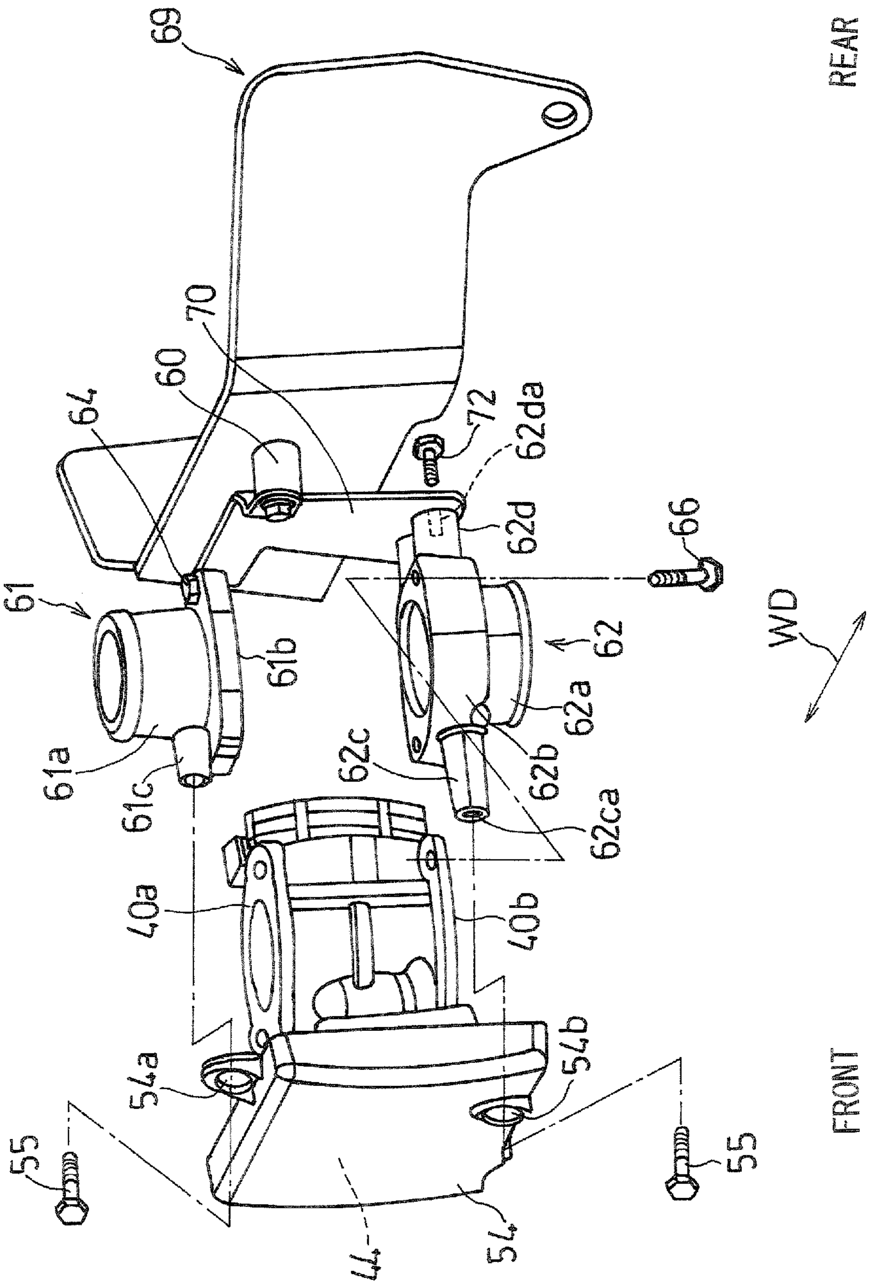
FIG. 6 shows an exploded perspective view of the mounting structure for the electronically controlled throttle, as seen in a direction different from FIG. 5.

As illustrated in FIG. 6, the cover member 54 is detachably attached to the throttle body 40 using fasteners 55 such as bolts. These are merely some of the non-limiting examples of material, shape, and other qualities of the cover member 54. For instance, a cover member 54 with a larger shape may be provided and attached to the parts mounting plate 69 to cover the front of the control circuit board 44 and fuel pump 50 together.

As illustrated in FIG. 2, the control circuit board 44 has a side which faces towards the throttle body 40—that is, a rear side of the control circuit board 44-, and an electrical cable 56 is connected to the rear side of the control circuit board 44. More specifically, the rear side of the control circuit board 44 is provided with a connector 58 to which the electrical cable 56 can be connected. As illustrated in FIG. 3, the connector 58 is located on a part of the rear side of the control circuit board 44 which faces away from the fuel pump 50. The electrical cable 56 extends in the widthwise direction WD of the engine on the front of the engine E so as to connect to a vehicle electrical system (not shown).

As discussed earlier with reference to FIG. 2, the inlet 32*a* of the electronically controlled throttle 32 is connected with the downstream end 30*ab* of the upstream air intake pipe 30*a*, whereas the upstream end 30*aa* of the upstream air intake pipe 30*a* is connected with the air cleaner 26 which is supported on the air intake manifold 34 (FIG. 3). Accordingly, the upper part of the electronically controlled throttle 32 is supported by the air intake manifold 34 through the upstream air intake pipe 30*a* which is formed of elastic material.

Further, the outlet 32*b* of the electronically controlled throttle 32 connects to the upstream end 30*ba* of the downstream air intake pipe 30*b*, and the downstream end 30*bb* of the downstream air intake pipe 30*b* connects to the air intake manifold 34. Accordingly, the lower part of the electronically controlled throttle 32 is supported by the air intake manifold 34 (FIG. 3) through the lower air intake pipe 30*b* which is formed of elastic material.

Moreover, the electronically controlled throttle 32 is mounted, at the rear side thereof, to the engine body EB through elastic elements 60 such as rubber. More specifically, the rear side of the throttle body 40 is attached to the parts mounting plate 69 on the engine body EB through the elastic elements 60. Thus, the electronically controlled throttle 32 is mounted to the engine body EB through the elastic elements 60 and the air intake pipe 30 which is formed of elastic material. Accordingly, the electronically controlled throttle 32 is supported by the engine body EB in a rubber-mounted configuration which will be discussed in detail below.

The engine E in the instant embodiment includes a first coupling member 61 coupled to the inlet 40*a* of the throttle body 40 and a second coupling member 62 coupled to the outlet 40*b* of the throttle body 40. As illustrated in FIG. 5, the first coupling member 61 includes a cylindrical tubular section 61*a* and a flange section 61*b* formed on an end of the tubular section 61*a* and having an external diameter greater than that of the tubular section 61*a*. The flange section 61*b* is detachably coupled to the inlet 40*a* of the throttle body 40 by means of fasteners 64 such as bolts. The flange section 61*b* in the instant embodiment has a rectangular, external shape when viewed in the axial direction.

Further, the tubular section 61*a* is fitted with the upstream air intake pipe 30*a* and is clamped thereto with a clamp element 65 such as a band, as shown in FIG. 2. In this manner, the upstream air intake pipe 30*a* connects to the inlet 40*a* of the throttle body 40 through the first coupling member 61. As illustrated in FIG. 5, the tubular section 61*a* of the first coupling member 61 has a front side which is formed with a first cylindrical boss portion 61*c* creating a forward protrusion. The first boss portion 61*c* defines a hollow bore which is formed with a female threading 61*ca*.

As illustrated in FIG. 6, the second coupling member 62 also includes a cylindrical tubular section 62*a* and a flange section 62*b* formed on an end of the tubular section 62*a* and having an external diameter greater than that of the tubular section 62*a*. The flange section 62*b* is detachably coupled to the outlet 40*b* of the throttle body 40 by means of fasteners 66 such as bolts. The flange section 62*b* in the instant embodiment has a rectangular, external shape when viewed in the axial direction. Further, the tubular section 62*a* is fitted with the downstream air intake pipe 30*b* and is clamped thereto with a clamp element 68 such as a band, as shown in FIG. 2. In this manner, the downstream air intake pipe 30*b* connects to the outlet 40*b* of the throttle body 40 through the second coupling member 62.

As illustrated in FIG. 6, the flange section 62*b* of the second coupling member 62 has a front side which is formed with a second cylindrical boss portion 62*c* creating a forward protrusion. The second boss portion 62*c* defines a hollow bore which is formed with a female threading 62*ca*. In addition, as illustrated in FIG. 5, the flange section 62*b* of the second coupling member 62 has a rear side which is formed with a third cylindrical boss portion 62*d* providing a rearward protrusion. In the instant embodiment, the third boss portion 62*d* comprises two such portions arranged adjacently in the widthwise direction WD. The third boss portions 62*d* define hollow bores which are formed with respective female threadings 62*da* (FIG. 6).

A bracket 70 produced from a metal sheet is attached to the third boss portions 62*d* of the second coupling member 62. More specifically, as illustrated in FIG. 6, fasteners 72 such as bolts are inserted from the rear through first insertion holes 70*a* formed in the bracket 70 and are screwed into the female threadings 62*da* of the third boss portions 62*d*. Alternatively, the bracket 70 may be produced from material other than a metal sheet.

The bracket 70 and the parts mounting plate 69 are coupled to each other through the elastic elements 60. As illustrated in FIG. 5, each of the elastic elements 60 in the instant embodiment comprises a cylindrical rubber element 60*a* which has axial opposite end sides provided with male threadings 60*b*, 60*b* protruding therefrom. One of the male threadings 60*b* is screwed from the front into a corresponding one of attachment holes 69*a* (FIG. 1) of the parts mounting plate 69. Each of the attachment hole 69*a* comprises a weld nut, for example. The other of the male threadings 60*b* is inserted through a corresponding one of second insertion holes 70*b* formed in the bracket 70 and is tightened with a nut 74. As a result, the throttle body 40 is supported by the engine body EB through the bracket 70, the elastic elements 60, and the parts mounting plate 69.

As illustrated in FIG. 6, the cover member 54 is attached to the throttle body 40 through the first boss portion 61*c* of the first coupling member 61 and the second boss portion 62*c* of the second coupling member 62. In particular, the cover member 54 has upper and lower end portions which are respectively formed with upper and lower insertion holes 54*a*, 54*b* that are oriented in the longitudinal direction.

The fasteners 55, 55 such as bolts are inserted from the front through the upper and lower insertion holes 54*a*, 54*b* and screwed into the female threading 61*ca* of the first boss portion 61*c* and the female threading 62*ca* of the second boss portion 62*c*, respectively. As a result, the cover member 54 is attached to the throttle body 40. The above is merely one of the non-limiting examples of how the cover member 54 may be mounted.

According to the configuration described so far, as illustrated in FIG. 2, the control circuit board 44 is arranged to a side of the throttle body 40 which faces away from the engine body EB. Thus, a spacing can be secured between the engine body EB and the air intake passage IP for installing additional components. In this way, the space around the electronically controlled throttle 32 can be used more efficiently. Further, the extension of the principal surface of the control circuit board 44 is oriented in a direction perpendicular to the longitudinal direction LD along the throttle body 40, thereby limiting the extent to which the control circuit board 44 sticks out forwards from the engine body EB. As a result, increase in the dimensions of the engine E can be prevented or otherwise mitigated.

In the instant embodiment, as illustrated in FIG. 3, the gearbox 48 of the electronic control unit 38 is arranged so as to be interposed between the engine body EB and the throttle body 40. According to this configuration, when viewed in a plan view, the control circuit board 44, the motor 46, and the gearbox 48 can be arranged in a U-shaped configuration in which these components are positioned in a conglomerated manner around the air intake passage IP.

In the instant embodiment, the control circuit board 44 has a rear side which faces towards the engine body EB and which is provided with the connector 58 to which the electrical cable 56 can be connected as shown in FIG. 2. According to this configuration, it is possible to keep down the extent to which the electrical cable 56 sticks out from the engine body EB. As a result, increase in the dimensions of the engine E can be prevented or otherwise mitigated.

In the instant embodiment, the control circuit board 44 extends away from the fuel pump 50 in the widthwise direction WD. According to this configuration, it is possible to prevent space interference of the control circuit board 44 with the fuel pump 50.

In the instant embodiment, the air intake pipe 30 which connects to the throttle body 40 as shown in FIG. 2 is formed of elastic material, and the throttle body 40 is detachably mounted to the engine body EB through the elastic elements 60. The electronically controlled throttle 32, which is an electronically assisted component with a considerable weight, is sensitive to vibrations. According to this configuration, the throttle body 40 is supported in a rubber-mounted configuration that can limit the transmission of vibrations from the engine E to the electronically controlled throttle 32.

In the instant embodiment, as illustrated in FIG. 5, the control circuit board 44 is covered externally by the cover member 54. According to this configuration, the control circuit board 44 can be protected against obstacles and flying objects in the environment. Further, the cover member 54 is detachably attached to the throttle body 40. According to this configuration, a small cover member 54 can be used to protect the control circuit board 44, thereby limiting an increase in the weight of the engine E.

In the instant embodiment, as illustrated in FIG. 2, the engine E is in the form of a vertical-shaft engine with a crankshaft 2 defining an axis AX which extends in the vertical direction and comprises an air cleaner 26 arranged at the upper part of the engine body EB. Further, the electronically controlled throttle 32 is arranged below the air cleaner 26 and above the cylinders 8, and is fitted with the air intake pipe 30 at a part of the air intake pipe 30 where it extends in the vertical direction. According to this configuration, it is possible to prevent the control circuit board 44 from sticking out from the engine E in the horizontal direction.

The above described embodiments represent only some of the non-limiting configurations according to the present disclosure. Numerous additions, modifications, or omissions can be made therein without departing from the principle of the present disclosure. By way of example, while the previous embodiments have been described in connection with an example use of an engine air intake structure according to the present disclosure in a two-cylinder V engine, an engine air intake structure according to the present disclosure can also be used with engines other than two-cylinder V engines, including V engines with four or more cylinders and single-cylinder engines, for example. Moreover, an engine according to the present disclosure can be installed in any orientation in a work machine. Specifically, it can be installed in a work machine in such a way that the direction of opening of the V shape is oriented to the "side" by extending perpendicular or transverse to the direction of travel of the work machine. Hence, such variants are also encompassed within the scope of the present disclosure.

What is claimed is:

1. An engine air intake structure comprising:

an electronically controlled throttle including
- a throttle valve which regulates an amount of air to be supplied to the engine,
- a throttle body which accommodates the throttle valve therein, and
- an electronic control unit which controls the throttle valve, the electronic control unit including a control circuit board, the control circuit board being arranged to a side of the throttle body which faces away from an engine body of the engine; and an air intake pipe which delivers intake air to an air intake port of the engine, the electronically controlled throttle being attached to the air intake pipe, wherein the throttle valve extends in a direction perpendicular to an axis of the throttle body, the electronic control unit includes a motor which actuates the throttle valve and a gearbox accommodating a gearing which changes a speed of rotation from the motor, the gearbox is arranged so as to be interposed between the engine body and the throttle body, and the control circuit board, the motor, and the gearbox, which form the electronic control unit, are arranged in a U shape configuration.

2. The engine air intake structure as claimed in claim 1, wherein the control circuit board and the gearbox protrude in a common direction relative to the throttle body.

3. The engine air intake structure as claimed in claim 1, wherein the control circuit board extends in a direction perpendicular to an axis of the throttle body.

4. The engine air intake structure as claimed in claim 1, wherein the throttle body is detachably mounted to the engine body through an elastic element.

5. The engine air intake structure as claimed in claim 1, further comprising a cover member externally covering the control circuit board.

6. The engine air intake structure as claimed in claim 1, wherein the engine is in the form of a vertical-shaft engine defining an axis of rotation of the engine which axis extends in the vertical direction, the engine comprises an air cleaner which purifies the intake air, the air cleaner being arranged at an upper part of the engine body and including a cylindrical cleaner casing, the throttle body is arranged below the cleaner casing, and the control circuit board has a principal surface which extends parallel to an axis of the cleaner casing and downwards relative to the throttle body.

7. An engine air intake structure comprising:

an electronically controlled throttle including
- a throttle valve which regulates an amount of air to be supplied to the engine,
- a throttle body which accommodates the throttle valve therein, and
- an electronic control unit which controls the throttle valve, the electronic control unit including a control circuit board, the control circuit board being arranged to a side of the throttle body which faces away from an engine body of the engine; and an air intake pipe which delivers intake air to an air intake port of the engine, the electronically controlled throttle being attached to the air intake pipe, wherein the control circuit board has a connector to which an electrical cable is connected on a surface thereof which faces towards the throttle body.

* * * * *